(12) United States Patent
Porres

(10) Patent No.: US 10,226,116 B1
(45) Date of Patent: Mar. 12, 2019

(54) CUP HOLDER ACCESSORY FOR CARRYING BAGS

(71) Applicant: Joaquin Rafael Alvarado Porres, Guatemala (GT)

(72) Inventor: Joaquin Rafael Alvarado Porres, Guatemala (GT)

(*) Notice: Subject to any disclaimer, the term of this patent is extended or adjusted under 35 U.S.C. 154(b) by 0 days.

(21) Appl. No.: 15/911,021

(22) Filed: Mar. 2, 2018

(51) Int. Cl.
*A45F 3/02* (2006.01)
*F16M 13/02* (2006.01)
*A45F 3/00* (2006.01)

(52) U.S. Cl.
CPC .............. *A45F 3/02* (2013.01); *F16M 13/022* (2013.01); *A45F 2003/001* (2013.01); *A45F 2003/003* (2013.01); *A45F 2200/0583* (2013.01)

(58) Field of Classification Search
CPC ................. A45F 3/02; A45F 2003/001; A45F 2003/003; A45F 2200/0583; A45F 3/16; A47G 23/0208; A47G 23/0216; A47G 23/0225; A47G 23/02; B60N 3/10; B60N 3/102; A45C 13/28

USPC .............. 224/148.1, 148.4–148.7; 248/311.2
See application file for complete search history.

(56) References Cited

U.S. PATENT DOCUMENTS

| | | | | |
|---|---|---|---|---|
| 1,121,179 | A * | 12/1914 | Sherman | B60N 3/102 232/41 R |
| 5,390,838 | A * | 2/1995 | Jafarkhani | A45F 5/00 224/148.4 |
| 7,415,932 | B1 * | 8/2008 | Ngo | A47B 23/001 108/115 |
| 2009/0206098 | A1* | 8/2009 | Garahan | A45F 5/02 220/737 |
| 2017/0318944 | A1* | 11/2017 | Murrey | B65D 25/205 |
| 2017/0325559 | A1* | 11/2017 | Johnson | A47G 23/0225 |

* cited by examiner

*Primary Examiner* — Christopher Garft
(74) *Attorney, Agent, or Firm* — Ruben Alcoba, Esq.

(57) ABSTRACT

A cup holder accessory for a carrying bag. The cup holder accessory comprises of a vertical support that attaches to a horizontal support. The horizontal supports attaches to a beverage support tray that can be placed in two positions. One position runs parallel to the horizontal support and the second position is perpendicular to the horizontal support. When the beverage support tray is in the horizontal position, a spring loaded door that is attached within the vertical support holds the beverage support tray in the horizontal position.

3 Claims, 7 Drawing Sheets

CUP HOLDER ACCESSORY FOR CARRYING BAGS

BACKGROUND

The present invention is directed to a cup holder accessory that can be mounted or strapped to a carrying bag that will allow a user to carry at least one beverage cup in a hands free fashion.

In today hustle and bustle, often people conduct business at coffee shops. They tend to take their backpacks or brief cases to the coffee shops. Often, they are forced to leave their business meetings in haste and are forced to drink their beverages hastily or to carry their beverage cups with their carrying bags. Beverages often spill or other accidents occur when people are forced to carry their carrying bags and their beverage cups together.

The process of carrying a beverage cup is even made harder when a person carries more than one beverage cup at a time.

The inventor identifying the above problem realized that there was a need for a cup holder accessory that could be securely attached to a backpack or other carrying bag that would carry at least one beverage cup during transit.

For the foregoing reason there is a need for a cup holder accessory that will attach to a carrying bag that will allow a user to transport a beverage cup, hands free, during transit.

SUMMARY

The present invention describes a cup holder accessory that attaches to a carrying bag.

The cup holder accessory for a carrying bag comprises: a vertical support that has a front, a rear, a top, a bottom side, a top portion and a bottom portion, the bottom portion of the vertical support defines an aperture, the vertical support has a first securing point on the front side of the bottom portion; a horizontal support that has a front, a rear, a left, a right, a top, a bottom side, the rear of the horizontal support is attached to the front top portion of the vertical support so that the left and right sides of the horizontal support extend outward from the vertical support, the bottom left and right sides of the horizontal support taper inward from the left and right bottom sides of the vertical support, at least one horizontal support aperture; an attachment device that connects to the at least one horizontal support aperture and to a carrying bag; a door that has a front and a rear side that is secured within the aperture via a pair of pins; a return spring that is mounted on one of the pins that is in contact with the rear side of the door; and a beverage support tray that has a front, a rear, a top and a bottom side, the top side of the beverage support tray defines an elongated u-shaped cavity, the bottom portion of the horizontal support fits within the u-shaped cavity and a pair of pins attach the beverage support to the horizontal support, the beverage support tray defines at least three beverage holder apertures, and the rear side has a second securing point that removably attaches to the first securing point.

In preferred embodiments, the cup holder accessory for a carrying bag will define a door stop on the rear side of the beverage support tray.

The attachment device of the present invention may be a belt or clip that will attach to a carrying bag.

The present invention is used by securing the cup holder accessory on to a carrying bag. Then, separating the horizontal support from the vertical support. Next, lifting the beverage support tray until it is at least at a 90 degree angle from the horizontal support, the door will automatically upon the 90 degree being reached. And lastly, placing at least one beverage cup within one of the beverage holder apertures of the beverage support tray.

An object of the present invention is to provide a cup holder accessory that can be attached to a carrying bag to transport at least one beverage cup in a hands free fashion.

Another object of the present invention is to provide a cup holder accessory that can be stowed within a carrying bag when not in use.

Yet another object of the present invention is to provide a cup holder attachment that could reduce spills or accidents.

DRAWINGS

These and other features, aspects, and advantages of the present invention will become better understood with regards to the following description, appended claims, and drawings where:

DESCRIPTION

Figure 1:
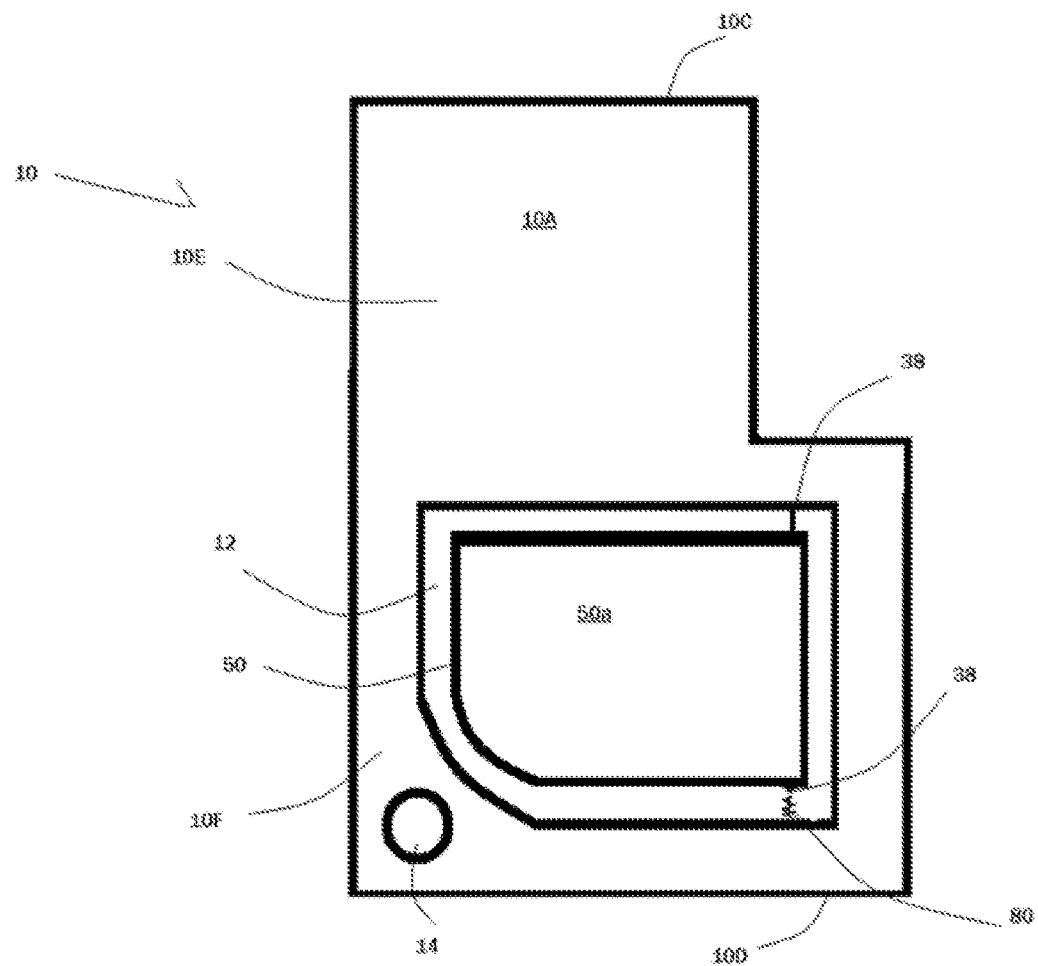
FIG. 1 is a front side view of vertical support of the present invention.
Figure 2:
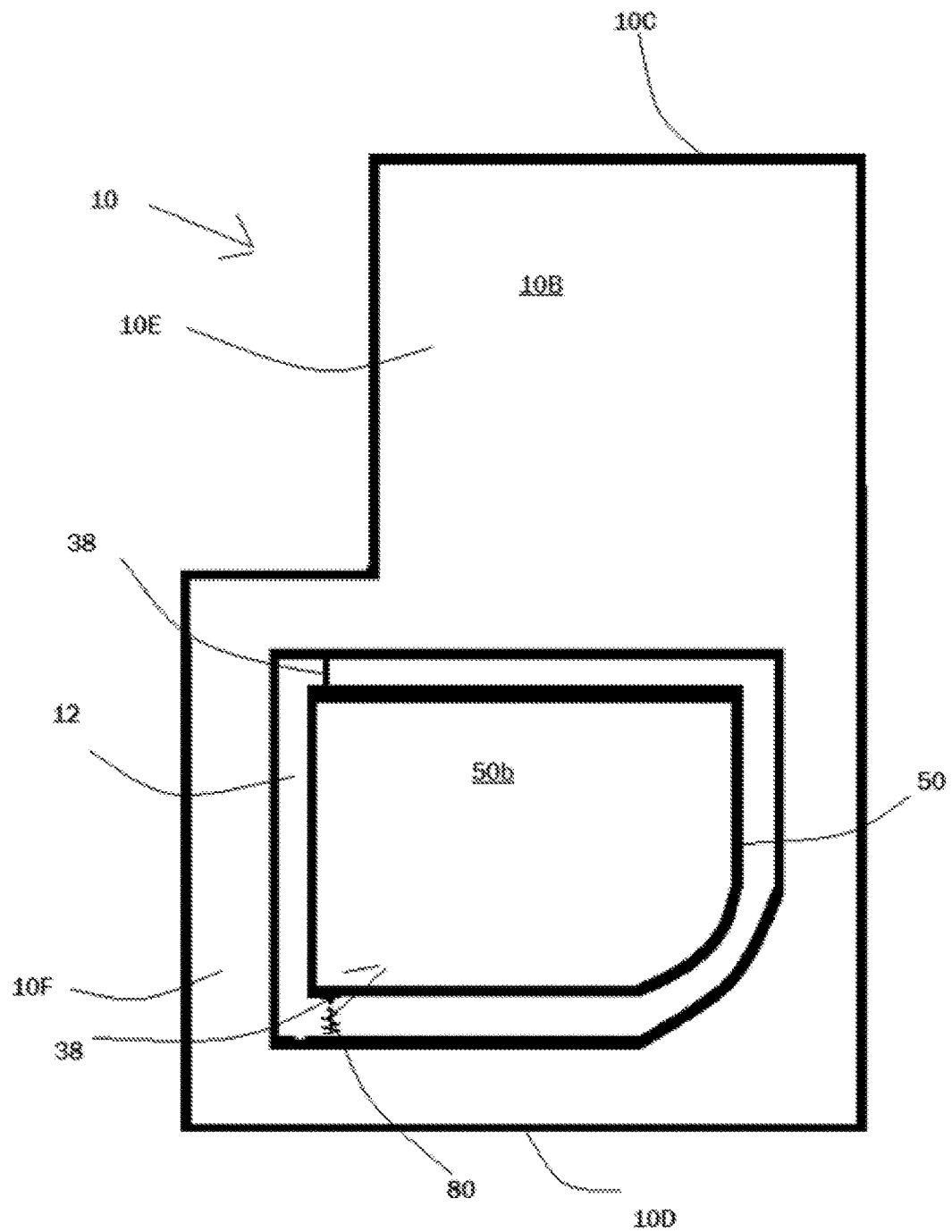
FIG. 2 is a rear side view of the vertical support.
Figure 3:
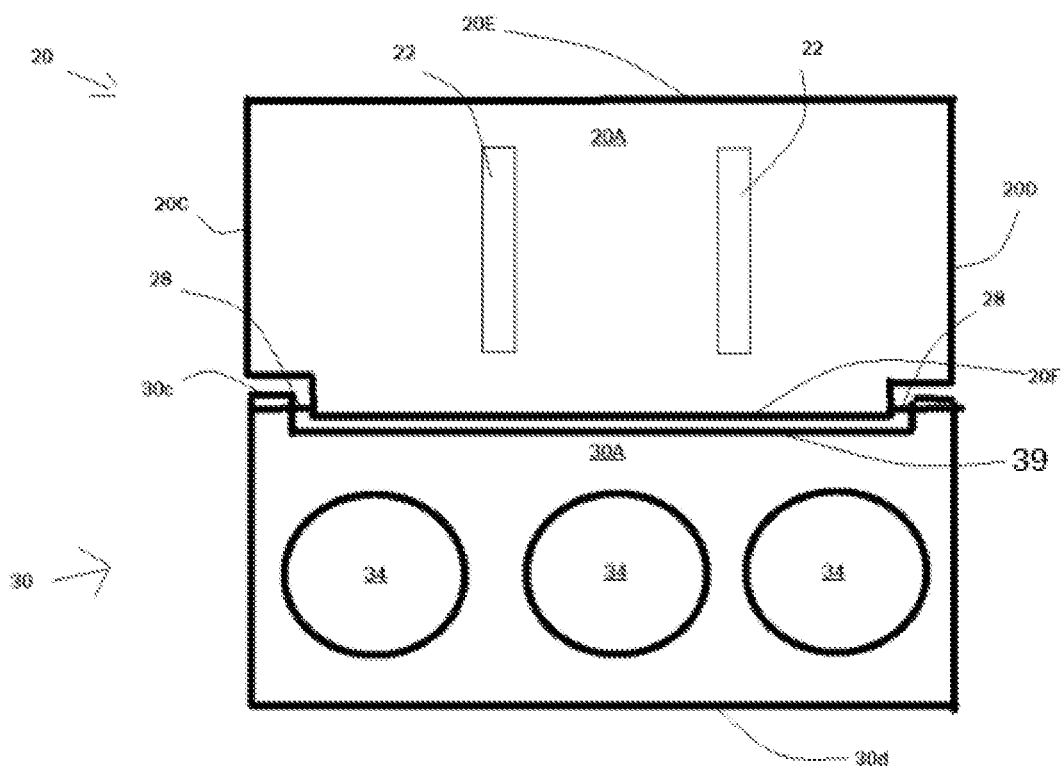
FIG. 3 is a front side view of the horizontal support and the beverage support tray of the present invention.
Figure 4:
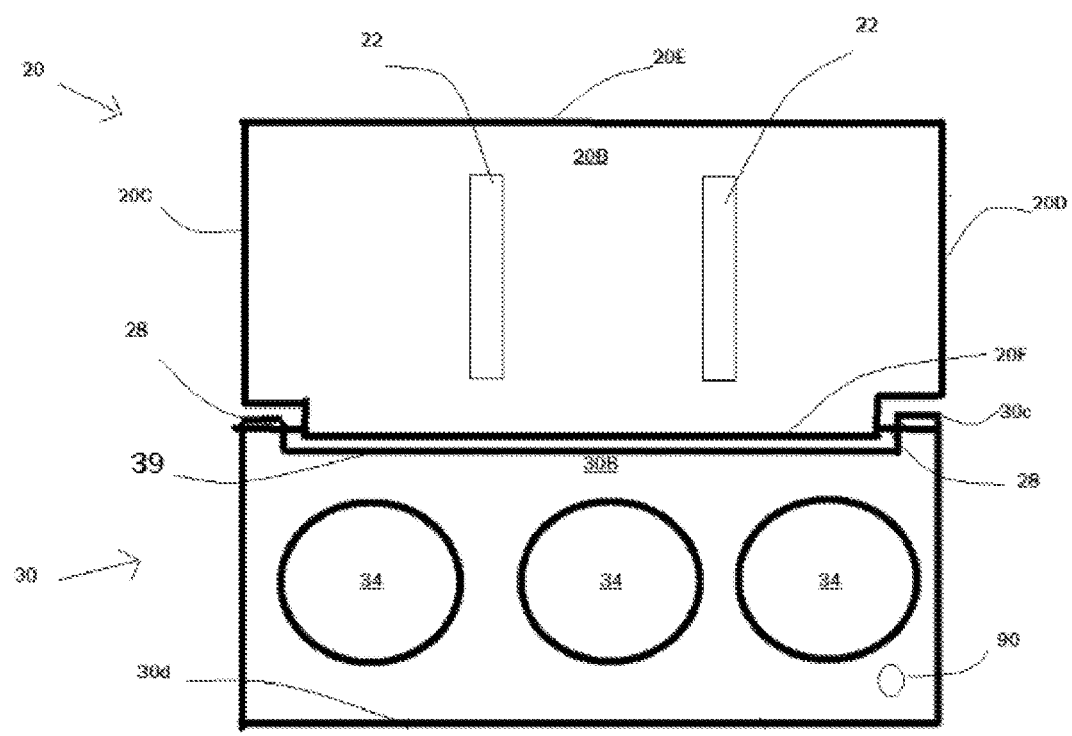
FIG. 4 is a rear side view of the horizontal support and the beverage support tray of the present invention.
Figure 5:
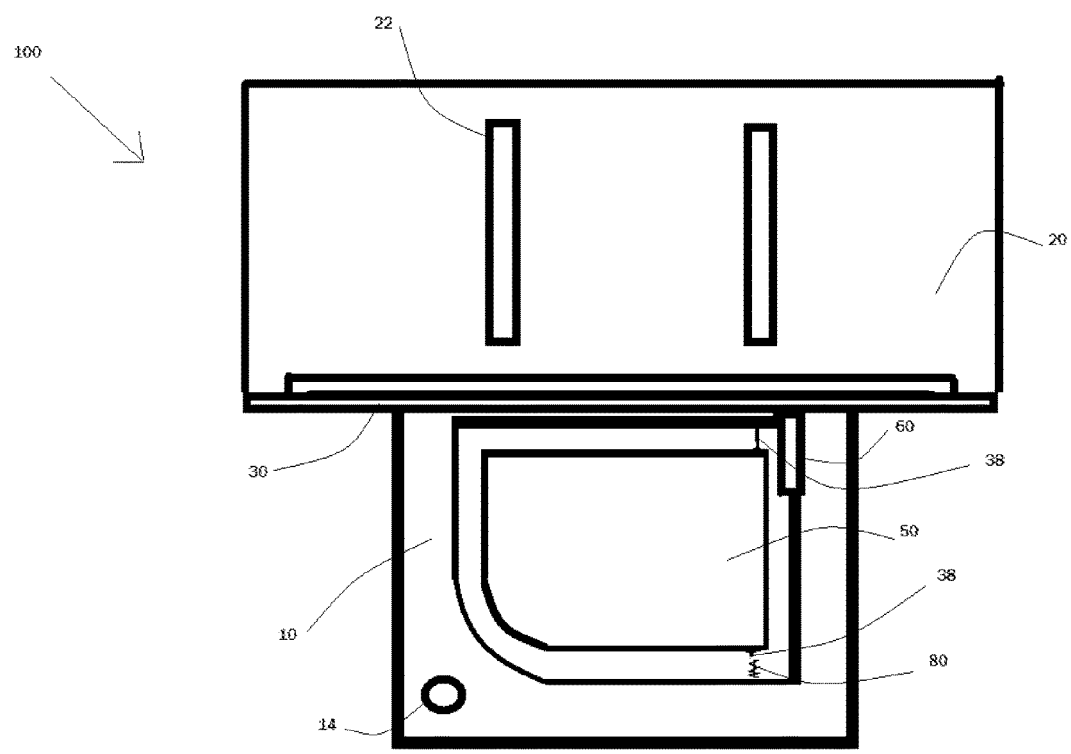
FIG. 5 is a front side view of the present invention with the beverage support tray in a 90 degree position, yet the door is not open.
Figure 6:
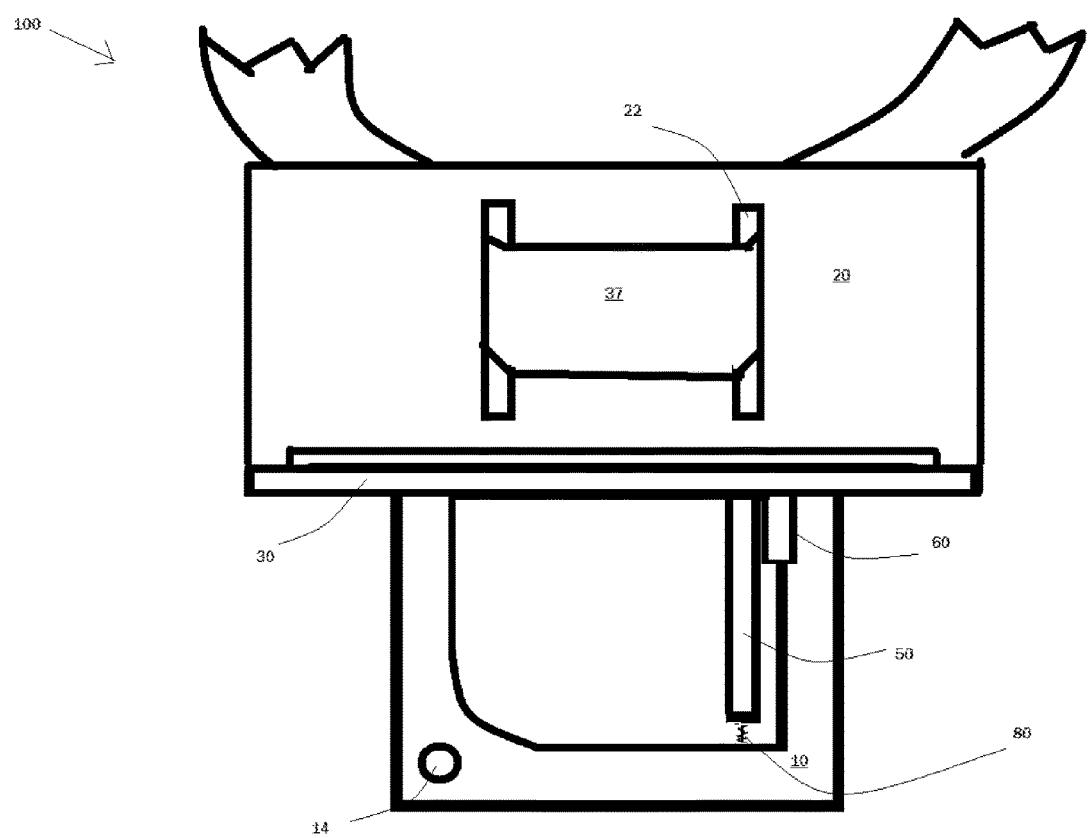
FIG. 6 is a front side view of the present invention with the beverage support tray in a 90 degree position with the door open.
Figure 7:
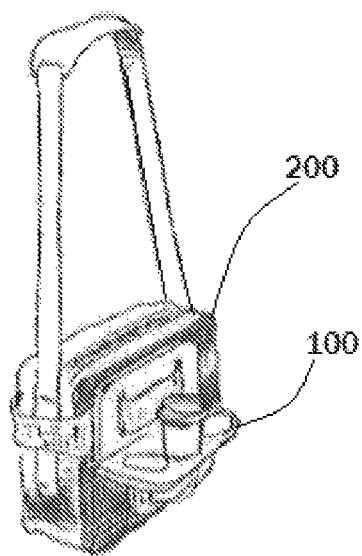
FIG. 7 is a perspective view of the present invention when it is secured on a carrying bag.

As seen in FIG. 1, the present invention is cup holder accessory 100 for a carrying bag 200. The cup holder accessory 100 comprises: a vertical support 10 that has a front 10a, a rear 10b, a top 10c, a bottom side 10d, a top portion 10e and a bottom portion 10f, the bottom portion 10f of the vertical support defines an aperture 12, the vertical support 10 has a first securing point 14 on the front side 10a of the bottom portion 10f; a horizontal support 20 that has a front 20a, a rear 20b, a left 20c, a right 20d, a top 20e, a bottom side 20f, the rear 20b of the horizontal support 20 is attached to the front top portion 10a of the vertical support 10 so that the left 20c and right sides 20d of the horizontal support 20 extend outward from the vertical support 10, the bottom left 20c and right sides 20d of the horizontal support 20 taper inward from the left 10c and right bottom sides 10d of the vertical support 10, at least one horizontal support aperture 22; an attachment device 37 that connects to the at least one horizontal support aperture 22 and to a carrying bag 200; a door 50 that has a front 50a and a rear side 50b that is secured within the aperture 12 via a pair of pins 38; a return spring 80 that is mounted on one of the pins 38 that is in contact with the rear side 50b of the door 50; and a beverage support tray 30 that has a front 30a, a rear 30b, a top 30c and a bottom side 30d, the top side 30c of the beverage support tray 30 defines an elongated u-shaped cavity 39, the bottom portion of the horizontal support 20f fits within the u-shaped cavity 39 and a pair of pins 28 attach the beverage support tray 30 to the horizontal support 20, the beverage support tray defines 30 at least three beverage holder apertures 34, and the rear side 30b has a second securing point 90 that removably attaches to the first securing point 14.

In preferred embodiments of the present invention, the cup holder accessory 100 will comprise of a door stop 60 that is defined on the rear side 30b of the beverage support tray 30.

The attachment device of the present invention may be a belt 37 or a clip (not shown in the figures).

An advantage of the present invention is that it provides a cup holder accessory that can be attached to a carrying bag to transport at least one beverage cup in a hands free fashion.

Another advantage of the present invention is that it provides a cup holder accessory that can be stowed within a carrying bag when not in use.

Yet another advantage of the present invention is that it provides a cup holder attachment that will reduce spills or accidents.

What is claimed is:

1. A cup holder accessory for a carrying bag, the cup holder accessory comprises:
    a vertical support that has a front, a rear, a top, a bottom side, a top portion and a bottom portion, the bottom portion of the vertical support defines an aperture, the vertical support has a first securing point on a front side of the bottom portion;
    a horizontal support that has a front, a rear, a left, a right, a top, a bottom side, the rear of the horizontal support is attached to the front top side of the vertical support so that the left and right sides of the horizontal support extend outward from the vertical support, a bottom left and a right side of the horizontal support taper inward from a left and a right bottom side of the vertical support, at least one horizontal support aperture;
    an attachment device that connects to the at least one horizontal support aperture and to a carrying bag;
    a door that has a front and a rear side that is secured within the aperture via a pair of pins;
    a return spring that is mounted on one of the pins that is in contact with the rear side of the door; and
    a beverage support tray that has a front, a rear, a top and a bottom side, the top side of the beverage support tray defines an elongated u-shaped cavity, the bottom side of the horizontal support fits within the u-shaped cavity and a pair of pins attach the beverage support to the horizontal support, the beverage support tray defines at least three beverage holder apertures, and the rear side of the beverage support tray has a second securing point that removably attaches to the first securing point, wherein the beverage support tray in a first position is fixedly attached to the first securing point of the vertical support and in a second position is perpendicular to the vertical support and is kept in the second position via the door that automatically opens when the beverage support tray is released from the first securing point, the door will remain open until a user forcibly moves the door toward a closed position and then secures the beverage support tray via its second securing point to the first securing point of the vertical support.

2. The cup holder accessory for a carrying bag of claim 1, the cup holder accessory comprises a door stop on the rear side of the beverage support tray.

3. The cup holder accessory for a carrying bag of claim 2, wherein the attachment device is a belt.

* * * * *